United States Patent Office 3,219,526
Patented Nov. 23, 1965

3,219,526
STERILIZING AND ANTISEPTIC
COMPOSITIONS
Benjamin F. Gurney, Glen Ellyn, Ill., assignor to Loyola University, Chicago, Ill., a corporation of Illinois, not for profit
No Drawing. Filed June 17, 1963, Ser. No. 288,435
1 Claim. (Cl. 167—60)

This invention relates to a sterilizing and antiseptic composition which is particularly adapted for use in the dental profession.

Among the materials which have been used as sterilizing and antiseptic compositions in the dental profession are eugenol (2-methoxy allyl phenol or 4-allyl guiacol), para-monochlorphenol in camphor, creosote, and formo-cresol mixtures. However, I have found that while eugenol has substantial analgesic properties, it has no value whatsoever as a fungicidal agent, and has only minor value as a bactericidal agent for use in the treatment of the dental cavity.

Moreover, while a solution of para-monochlorphenol in camphor, or creosotes, or formo-cresols, have been used heretofore in the dental profession as sterilizing and antiseptic agents, all of these materials have a highly penetrating and objectionable odor which is well known to dentists, and which renders their use objectionable.

In the present invention I have found that a mixture of eugenol (2-methoxy allyl phenol or 4-allyl guiacol) and 5-nitro-2-methylfurfuryl ether provides an excellent sterilizing and antiseptic composition for use in the dental profession.

Moreover, I have found that the action of reducing agents, and the action of reductase enzymes, such as are found in blood, serum and plasma, tend to nullify the action of 5-nitro-2-methylfurfuryl ether in aqueous solutions, whereas in the practice of the present invention, employing a mixture of eugenol and 5-nitro-2-methylfurfuryl ether, the action of reductase enzymes as found in blood, serum and plasma, on the 5-nitro-2-methylfurfuryl ether, is substantially reduced. I believe that this protective action of the eugenol on the 5-nitro-2-methylfurfuryl ether is due to a physical or chemical protective action of the eugenol on the 5-nitro-2-methylfurfuryl ether (NMFE), and, in part, to the unsaturated linkage in the allyl radical of the eugenol which, in part, absorbs the reducing action of reducing agents and reductase enzymes such as are found in blood, serum and plasma.

Accordingly, an object of the present invention is to provide a new and improved sterilizing and antiseptic composition for use in the dental profession and which has both bactericidal and fungicidal characteristics when used in the dental cavity.

Another object of the present invention is to provide a new and improved sterilizing and antiseptic composition for use in the dental profession and which has bactericidal and fungicidal characteristics substantially greater than sterilizing and antiseptic compositions heretofore used in the dental profession while, at the same time, having excellent analgesic properties.

A further object of the present invention is to provide a new and improved sterilizing and antiseptic composition for use in the dental profession which is free from the objectionable odor of certain of the materials heretofore used and, particularly, a solution of paramonochlorphenol in camphor, creosote, or formo-cresols.

A further object of the present invention is to provide a new and improved sterilizing and antiseptic composition for use in the dental profession which is substantially less toxic than para-monochlorphenol in camphor, or creosote, or formo-cresols, while at the same time having excellent therapeutic and analgesic properties.

Thus, in the practice of the present invention the new sterilizing and antiseptic composition may be prepared in accordance with any of the following examples:

*Example 1*

|  | Ml. |
|---|---|
| Eugenol (2-methoxy allyl phenol or 4-allyl guiacol) | 99.92 |
| NMFE (5-nitro-2-methylfurfuryl ether) | 0.08 |

*Example 2*

| Eugenol (2-methoxy allyl phenol or 4-allyl guiacol) | 99.84 |
|---|---|
| NMFE (5-nitro-2-methylfurfuryl ether) | 0.16 |

*Example 3*

| Eugenol (2-methoxy allyl phenol or 4-allyl guiacol) | 99.50 |
|---|---|
| NMFE (5-nitro-2-methylfurfuryl ether) | 0.50 |

*Example 4*

| Eugenol (2-methoxy allyl phenol or 4-allyl guiacol) | 99.00 |
|---|---|
| NMFE (5-nitro-2-methylfurfuryl ether) | 1.00 |

*Example 5*

| Eugenol (2-methoxy allyl phenol or 4-allyl guiacol) | 96.00 |
|---|---|
| NMFE (5-nitro-2-methylfurfuryl ether) | 4.0 |

In the practice of the present invention the eugenol (2-methoxy allyl phenol or 4-allyl guiacol) component of the new sterilizing and antiseptic composition may be employed within a range of not substantially more than 99.92 percent, by volume, of the composition and the NMFE (5-nitro-2-methylfurfuryl ether) component thereof may be employed within a range of from not substantially less than 0.08 percent to not substantially more than four (4) percent, by volume, of the composition.

It has been found in the practice of the present invention that the new and improved sterilizing and antiseptic composition possesses marked and easily demonstrable fungicidal or anti-yeast properties when the NMFE component thereof is employed in the lower area of its workable range, namely, at approximately 0.08 percent, by volume, of the composition, and that when the NMFE component is used in this relatively small percentage there is no substantial suppression of the analgesic properties of the eugenol. At the same time, the antibacterial or bactericidal characteristics of the composition are greatly enhanced as compared to or relative to the bactericidal action of the eugenol, used alone, which, and when so used, is considered to be only a moderately good anti-bacterial or bactericidal agent.

It has also been found in the practice of the present invention that when the NMFE (5-nitro-2-methylfurfuryl ether) component of the composition is used at a concentration substantially in excess of four (4) percent, by volume, of the composition, there may be a tendency of the NMFE (5-nitro-2-methylfurfuryl ether) component to become toxic to the skin and also possibly toxic to periapical tissues, and it is likewise indicated that a concentration of the NMFE (5-nitro-2-methylfurfuryl ether) substantially in excess of four (4) percent, by volume, of the composition may tend to stain the dentine and cause discoloration of the teeth.

As indicated hereinbefore, the therapeutic properties of NMFE (5-nitro-2-methylfurfuryl ether) in aqueous solutions is easily destroyed by reducing agents such as reductase enzymes found in blood, serum and plasma, as well as by other reducing agents, such as sodium-thioglycollate, ascorbic acid and sodium-ascorbate, whereas, in the use of the sterilizing antiseptic composition of the present invention, embodying a mixture of NMFE (5-nitro-2-methylfurfuryl ether) and eugenol (2-methoxy allyl phenol or 4-allyl guiacol), contact of the new sterilizing and antiseptic composition with reducing solutions results only in a slow loss of the therapeutic properties of the new sterilizing and antiseptic composition.

In the practice of the present invention, I have found that while other materials may function equally well as eugenol as a solvent for the NMFE, and among these are Cresatin (metacresylacetate), metacresylacetate alone has no anti-yeast or fungicidal properties, and when used as a solvent with the NMFE shows remarkably poor ability to resist the reducing action of reducing agents such as reductase enzymes which are found in blood, serum and plasma, and other reducing agents such as those referred to above.

In the practice of the present invention I have found that a reaction occurs between the eugenol component and the NMFE component when the two components of the new sterilizing and antiseptic composition are brought together. The reaction of these two components is rapid and produces a highly colored complex substance or reaction product which is stable in eugenol but is unstable in ethyl alcohol. This reaction can be reversed by means of ethyl alcohol, thus indicating that the linkage between the eugenol component and the NMFE component of the new sterilizing and antiseptic composition is probably of the hydrogen bond type. Moreover, I have found that such a reaction does not occur when the NMFE component is employed with any of the common organic solvents in which it is soluble, including Cresatin (metacresylacetate). However, the reaction of the NMFE component does occur with phenol compounds having exposed hydroxyl groups, although in such instances the colored reaction product appears in only a fraction of the degree in which it is found when the NMFE component is dissolved in eugenol. Thus, I believe that the relatively intensely colored reaction product of the NMFE and eugenol components of the new sterilizing and antiseptic composition may be due to molecular resonance, or that it may be due to a different type of linkage other than that which would normally be expected under such circumstances.

In addition, I have observed that at 4200° angstroms the differences in absorption between the reaction product of the eugenol and NMFE chromophore and the phenol-NMFE chromophore is large and significant.

In the practice of the present invention I have also established that the new sterilizing and antiseptic composition is superior to a composition prepared by dissolving the NMFE component thereof in the Cresatin (metacresylacetate), employing the same concentration of the NMFE component, and that the superior antifungal activity of the new sterilizing and antiseptic composition is shown by available therapeutic evidence to be due to the colored reaction product of the eugenol and NMFE components of the new sterilizing and antiseptic composition.

The formo-cresol mixtures hereinbefore referred to are mixtures of formaldehyde and cresol, usually in about equal proportions.

Furthermore, at comparable concentrations of NMFE, Cresatin (metacresylacetate) solutions exhibit an antifungal activity definitely inferior to that of a eugenol solution.

Hence, it has been found in the practice of the present invention that the eugenol component of the new sterilizing and antiseptic composition functions not only as a solvent for the NMFE component but also contributes substantially to the bactericidal and fungicidal characteristics of the new sterilizing and antiseptic composition while, at the same time, retaining its analgesic properties.

It will thus be seen from the foregoing description that the present invention provides a new and improved sterilizing and antiseptic composition, particularly for use in the dental profession, and thus has the desirable advantages and characteristics and accomplishes its intended objects including those hereinbefore pointed out and others which are inherent in the invention.

I claim:

A non-aqueous sterilizing and antiseptic composition comprised of a solution of 5-nitro-2-methylfurfuryl ether and eugenol, the eugenol component being incorporated in the composition within a range from not substantially less than ninety-six (96) percent to not substantially more than 99.92 percent, by volume, of the composition, and the 5-nitro-2-methylfurfuryl ether component being incorporated in the composition within a range of from not substantially less than 0.08 percent to not substantially more than four (4) percent, by volume, of the composition.

References Cited by the Examiner

UNITED STATES PATENTS 2,927,056  3/1960  Gurney _____ 167—60

OTHER REFERENCES

The Dispensatory of the United States of America, 25th Ed., published by J. B. Lippincott Co., Philadelphia, 1955, page 565.

LEWIS GOTTS, Primary Examiner.

FRANK CACCIPAGLIA, JR., JULIUS LEVITT,
Examiners.